United States Patent [19]

Iaboni et al.

[11] 4,263,771
[45] Apr. 28, 1981

[54] MULCHING MOWER AND CLEAN-UP MACHINE

[76] Inventors: Albert Iaboni; Biagio Iaboni, both of 89-27 198th St., Hollis, N.Y. 11423

[21] Appl. No.: 71,343

[22] Filed: Aug. 30, 1979

[51] Int. Cl.³ .......................................... A01D 35/262
[52] U.S. Cl. .................................... 56/13.4; 56/13.8; 56/16.9; 56/202
[58] Field of Search .............................. 56/12.8–13.4, 56/13.7, 13.8, 16.9, 202, 320.1, 320.2

[56] References Cited

U.S. PATENT DOCUMENTS

| | | | |
|---|---|---|---|
| 2,491,544 | 12/1949 | Arkenberg | 56/12.9 |
| 2,777,270 | 1/1957 | Colclazier | 56/13.4 |
| 2,809,488 | 10/1957 | Sewell | 56/13.8 |
| 3,199,277 | 8/1965 | Moody | 56/202 |
| 3,905,181 | 9/1975 | Messner | 56/13.4 |
| 4,081,947 | 4/1978 | Szymanis | 56/202 |
| 4,087,955 | 5/1978 | Szymanis | 56/202 |

Primary Examiner—Jay N. Eskovitz
Attorney, Agent, or Firm—Blum, Kaplan, Friedman, Silberman & Beran

[57] ABSTRACT

A mulching mower and clean-up machine, adapted to cut and finely mulch grass, leaves and the like, is provided. A first blade member, supported on the underside of a movable housing, is adapted to cut grass and leaves on the ground and to discharge the cuttings through a discharge opening on the housing. A mulching chamber, mounted on the mower housing, includes an opening for receiving the discharged cuttings. A second blade member included in the mulching chamber, finely mulches the cuttings and discharges them through a further opening in the mulching chamber. A storage chamber is removably mounted on the mulching chamber for receiving the mulched cuttings.

10 Claims, 3 Drawing Figures

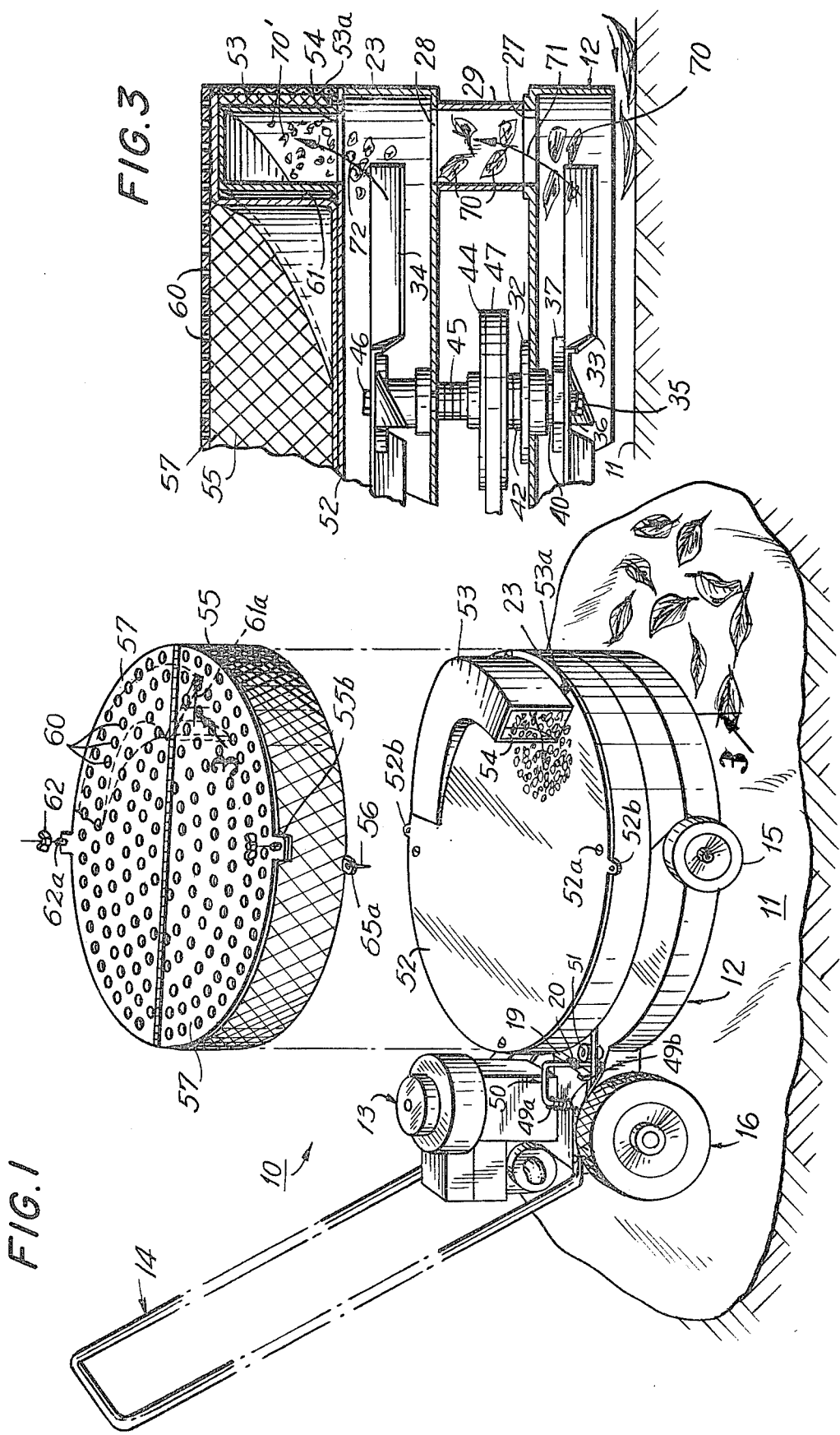

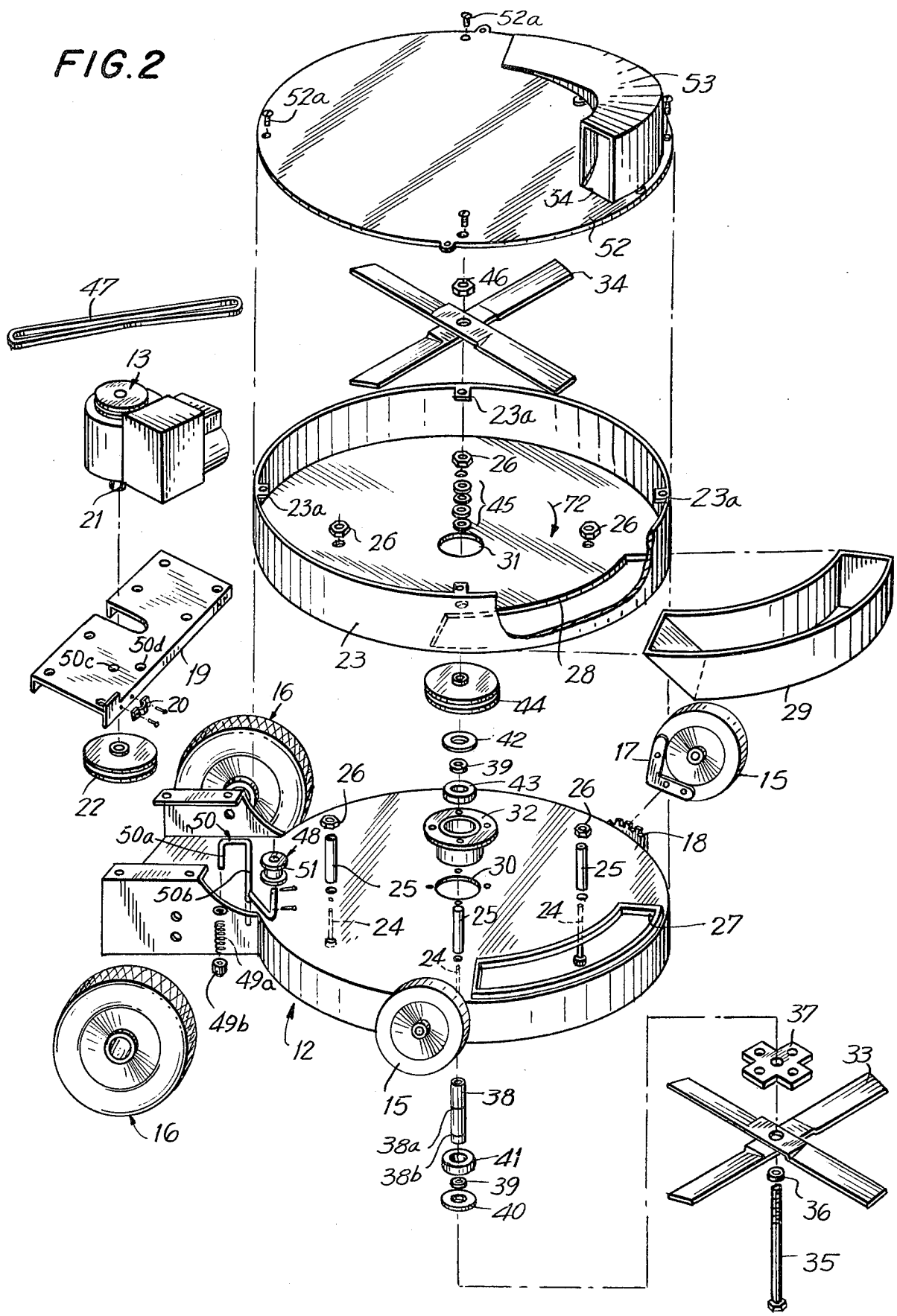

MULCHING MOWER AND CLEAN-UP MACHINE

BACKGROUND OF THE INVENTION

This invention is directed to a mulching mower and clean-up machine and, in particular, to mulching mower and clean-up machine including a first blade member for cutting grass, leaves and the like, and a separate mulching chamber having a second blade member for finely mulching the cuttings. The machine further includes a storage chamber providing for the storage and easy removal of the mulched cuttings.

Conventional lawn and mulching mowers generally provide only one or two blades for performing the cutting and mulching of grass and leaves, the blade or blades being located in a single compartment open to the ground for exposure to the grass and leaves and for drawing up the leaf cuttings and leaves for capture or dispersal. Such conventional lawn and mulching mowers have produced a relatively coarse mulch. Particularly where leaves are picked up, the product is of great bulk, requiring frequent grass bag changing and large storage facilities. Such a product is not particularly suitable for disposal in plant beds as mulch. In addition, lawn mowers are generally provided with a grass bag for collecting the discharged grass and leaves directly from a discharge chute. However, such grass bags prove to be a nuisance in that the bags are both bulky and cumbersome and therefore less than completely satisfactory.

Accordingly, it is desired to provide a mulching mower and clean-up machine that cuts and finely mulches grass, leaves and the like, and if desired, may store same in a storage chamber that does not interfere with the cutting activity. By providing a mulching mower and clean-up machine including at least one additional blade in a mulching compartment through which cut grass and leaves pass for fine mulching, and by further including a storage chamber releasably mounted on the mower housing for the storage of the mulched cuttings, the desired mower is provided.

SUMMARY OF THE INVENTION

Generally speaking, in accordance with the instant invention, a mulching mower and clean-up machine is provided including a movable mower housing having a cutting compartment open to the ground and having a discharge opening and a first blade member rotatably mounted in said housing cutting compartment in registration with said ground opening for cutting grass, leaves and the like, and for drawing the cuttings to said first compartment discharge opening. The mower housing further includes a mulching compartment in communication with said cutting compartment discharge opening for receiving cuttings therefrom and having an exit opening. A second blade member is rotatably mounted in said mulching compartment for finely mulching the cuttings received through the discharge chute and for drawing the mulched cuttings through the mulching compartment exit opening for discharge. A storage chamber may be removably mounted on the housing in communication with the mulching compartment exit opening for the storage of the mulched cuttings and for easy removal of the mulched cuttings. The mulching chamber may be provided with an entrance opening in communication with the discharge opening of the cutting compartment, said entrance and exit openings of said mulching compartment being positioned relative to each other so that the cuttings passing from one to the other are exposed to the second blade member over a substantial path.

The movable mower housing is provided with wheels and a handle which allow the mower to be guided over various terrains. The mower housing further may support a single motor for driving the two blade members. The motor includes a drive shaft having a drive pulley. The two blade members are secured to a single rotatable shaft, said rotatable shaft including a blade pulley thereon. A drive belt extends between the drive pulley and the blade pulley for transferring the rotation of the drive pulley to the blade pulley. The two blade members are rotated thereby.

Accordingly, it is an object of the instant invention to provide a mulching mower and clean-up machine for finely mulching grass, leaves and the like.

Another object of the instant invention is to provide a mulching mower and clean-up machine which includes two separate blade members driven by a single motor.

A further object of the instant invention is to provide a mulching mower and clean-up machine including a mulching compartment for finely mulching grass, leaves and the like.

Still a further object of the instant invention is to provide a mulching mower and clean-up machine incorporating a removable chamber, thereby facilitating storage and removal of the mulched cuttings.

Other objects and advantages of the invention will in part be obvious and will in part be apparent from the specification and drawings.

The invention, accordingly, comprises features of construction, combinations of elements, and arrangements of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 1 is a partially exploded perspective view of the mulching mower and clean-up machine constructed in accordance with the instant invention, shown situated on grass;

FIG. 2 is an exploded perspective view of the cutting and mulching portion of the machine of FIG. 1;

FIG. 3 is a sectional view taken along lines 3—3 of FIG. 1.

DESCRIPTION OF THE PREFERRED EMBODIMENTS

Reference is first made to FIG. 1 wherein a mulching mower and clean-up machine, generally indicated as 10, situated on a grass plot 11, is depicted. The mower includes a housing 12, a motor 13 being mounted in a support 19 mounted on said housing. Front wheels 15 and rear wheels 16 are rotatably mounted on the housing 12, and handle 14 is secured to housing 12 and provides for guiding of the mower over various terrains. A drive pulley 22 is secured to the drive shaft 21 of motor 13 between support 19 and mower housing 12.

Referring now to FIG. 2, the construction of the instant invention is illustrated. As aforenoted, housing 12 supports a pair of front wheels 15 rotatably adjustably mounted on the housing 12. A pair of rear wheels 16 are further rotatably mounted on the housing 12. Height adjustment of the housing is effected in a conventional manner by locating bracket 17, secured to the axle of front wheel 12, in the proper slot of slotted member 18, which is secured to the mower housing 12.

Mulching compartment 23 is mounted, in spaced relation, on the housing 12 by means of bolts 24, spacers 25 and nuts 26. Housing 12 is open on its lower side facing the ground and is provided with discharge opening 27 in the upper circumferential region thereof. The underside of mulching compartment 23 includes a similarly located entrance opening 28. Chute 29 is provided to connect discharge opening 27 with entrance opening 28. Thus, by means of spacers 25 and chute 29, mulching compartment 23 is mounted on the top side of housing 12, in spaced relation therewith.

Mower housing 12 and mulching compartment 23 are provided with center apertures 30 and 31 respectively, for allowing the blade assembly to be rotatably mounted thereon. Specifically, as will be detailed below, first blade member 33 is rotatably secured in the underside of mower housing 12, whereas second blade member 34 is rotatably secured within the mulching compartment 23. A single bolt 35 secures both first blade member 33 and second blade member 34 in their proper mounting positions.

As aforenoted, housing 12 and mulching compartment 23 are provided with center apertures 30 and 31, respectively, for allowing bolt 35 to extend therethrough. Specifically, aperture 30 in housing 12 receives a spindle housing 32. First blade member 33 is rotatably secured in the underside of housing 12 by means of bolt 35. Mounted on bolt 35 with the first blade member therebetween are washer 36 and blade holder 37. Spindle sleeve 38 is mounted on bolt 35 and is formed with spaced grooves 38a and 38b in the surface thereof. Bearings 41 and 43 are retained in position on spindle sleeve 38 by snap rings 39 and ride in spindle housing 32. A bearing stop 40 is provided between bearing 41 and blade holder 37 for engagement against the bottom of spindle housing 32 for defining the limit of upward displacement of the hereinafter defined blade assembly. Blade pulley 44 is mounted on and securely referenced to bolt 35 between housing 12 and mulching compartment 23 by spacer 25 so as to be substantially in the same plane as that defined by drive pulley 22. A bearing stop 42 is provided between pulley 44 and bearing 43 for engagement against the top of spindle housing 32 for defining the limit of downward displacement of the hereinafter defined blade assembly. Bolt 35 further extends through aperture 31 in mulching compartment 23 whereon a series of spacing washers 45 are provided for locating second blade member 34 within mulching compartment 23. Nut 46 is secured to retain together the blade assembly defined by first and second blade members, nut, bolt, spacers, bearing stops, spindle sleeve, bearings and pulley to the threaded end of bolt 35. This blade assembly rotates as a unit driven by motor 13 through pulleys 22 and 44 and drive belt 47, guided in spindle housing 32 by bearings 41 and 43.

Drive belt 47 transfers the torque exerted on drive pulley 22 by the drive shaft 21 of the motor 13, to blade pulley 44, thereby causing blade members 33 and 34 to rotate as noted above. Spool assembly 48 is adapted to selectively apply an outward force on drive belt 47, thereby keeping drive belt 47 taut and to permit disengagement of the belt when the motor is to be started. Specifically, spring 49a and stepped nut 49a are mounted on arm 50a of support 50. Arm 50b of support 50 is pivotably supported by bracket 20 on motor support 19 so that arm 50a may be selectively positioned over one of holes 50c or 50d in support 19. When positioned over one of said holes, spring 49a forces the lower stepped portion of nut 49b into that hole to position the spool 51. The nut is readily released by pulling upwardly for pivoting. Drive belt 47, extending between drive pulley 22 and blade pulley 44 is tensioned by spool 51 when nut 49b is in hole 50b.

Mulching compartment 23 is provided with a cover member 52 formed with an exit opening 54 adapted to be releasably secured to the top side of mulching chamber 23 by screws 52a engaging in tabs 23a formed in mulching compartment 23. A chute 53 is secured over exit opening 54 of cover 52 by screws 53a. Cover member 52 is positioned so that the bulk of exit opening 54 is out of registration with entrance opening 28 so as to minimize the direct vertical path therebetween while maximizing the path within mulching compartment 23 for cuttings as described below.

The operation of the instant invention will be explained with reference to FIG. 3. The torque exerted on blade pulley 44 by drive belt 47 is transferred to bolt 35. The rotation of bolt 35 causes first blade member 33 and the second blade member 34 to rotate. The first blade member 33 acts to cut grass, leaves and the like on the ground. First blade member 33 includes inclined cutting surfaces thereon, as is illustrated in FIG. 2, thereby providing a pumping action when the first blade member 33 is rotating. The pumping action due to the incline of the blade surfaces acts to draw leaves from the surface of the ground for cutting and to force the relatively large cuttings 70 through discharge opening 27 and chute 29, and through entrance opening 28 on the underside of mulching compartment 23 into mulching compartment 23 (arrow 71 of FIG. 3). Second blade member 34, included within the mulching compartment 23 then acts to finely mulch the cuttings received therein and further, due to similarly inclined surfaces on the second blade member 34, the mulched cuttings are forced through exit opening 54 and through chute 53. Specifically, the cuttings 70 are carried in the clockwise direction as viewed in FIG. 2 (arrow 72) about mulching compartment 23 in the path of second blade member 34 between entrance opening 28 and exit opening 54, said openings being positioned for this purpose. The fine mulch 70' passes through chute 53 in the direction of arrow 72. Note that chute 29 is inclined in said clockwise direction for guiding the cuttings.

As is illustrated in FIG. 1, a storage chamber 55 is adapted to be releasably secured to cover member 52 by means of pins 56 which depend from tabs 65a on storage chamber 55 and are received in holes in tabs 52b projecting laterally from cover 52. The bottom of storage chamber 55 is provided with a recess 61 shaped to correspond to and receive chute 53 and having an entrance opening 61a to said storage chamber in registration with said exit opening 54. Thus, the finely mulched cuttings that are discharged through chute 53 are collected and stored in storage chamber 55. Storage chamber 55 is provided with hinged cover members 57 providing for easy removal of the mulched cuttings. The hinged cover members 57 include a plurality of apertures 60 allowing for release of any air pressure caused by the blade member pumping action. Further, hinged cover members 57 are releasably held by wing nuts 62 engaged in bolts 62a retained in tabs 55b extending from the upper surface of storage chamber 55. The storage chamber could be lifted off the machine, turned over and readily emptied by this arrangement. However, any known storage means such as a conventional grass bag can be used.

The instant invention provides for safe operation in that first blade member 33 is rotatably secured to underside of housing 12, and second blade member 34 is fully enclosed within mulching compartment 23 and covered with cover member 52. Thus, unlike the conventional lawn mowers with side discharge chutes, the operator of the instant invention is more than sufficiently protected from the rotating blade members. Moreover, since motor 13 is mounted on a rear portion of housing 12, the operator's limbs are sufficiently protected from being injured by first blade member 33.

In order to fully automate the instant invention, a second drive belt can be provided to drivingly connect the wheels to the motor in a conventional manner. The instant mower can thus be adapted to become self-propelled.

Accordingly, the instant invention provides a mulching mower and clean-up machine which cuts and finely mulches grass, leaves and the like, provides storage for mulched cuttings which does not interfere with the operation of the mower, and is easy and safe to operate. Moreover, ease of removal of the mulched cuttings is provided for.

It will thus be seen that the objects set forth above and those made apparent from the preceding description, are efficiently attained and, since certain changes may be made in the above constructions without departing from the spirit and scope of the invention, it is intended that matters contained in the above description and shown in the accompanying drawings shall be interpreted as illustrative and not in a limiting sense.

It is also to be understood that the following claims are intended to cover all of the generic and specific features herein described, and all statements of the scope of the invention, which, as a matter of language, might be said to fall therebetween.

What is claimed is:

1. A mulching lawn mower comprising a movable housing open on the bottom thereof to the ground, said housing being formed to define a cutting compartment incorporating said ground opening and having a discharge opening in the top thereof in spaced relation to said ground opening, said housing further being formed to define a mulching compartment having an entrance opening in the bottom thereof in communication with said cutting compartment discharge opening and an exit opening in the top thereof in spaced relation to said entrance opening, said entrance and exit openings of said mulching compartment being positioned relative to each other so that substantially all cuttings entering said entrance opening traverse a predetermined path in the path of cutting displacement of said second cutting means before being drawn through said exit opening, said predetermined path of said cuttings including a major circumferential path substantially exceeding 180 degrees in said mulching compartment, first cutting means mounted for rotation about an axis in said cutting compartment in registration with said ground opening for cutting grass and the like; second cutting means mounted for rotation about an axis in said mulching compartment for mulching said cut grass and the like; said first and second cutting means being adapted to draw leaves and the like to the first cutting means for cutting, to draw the cuttings produced by said first cutting means through said cutting compartment discharge opening and said mulching compartment entrance opening to said second cutting means for fine mulching and for drawing the mulched cuttings to and through said exit opening; and motor means secured to said housing and operatively coupled to said first and second cutting means for driving said first and second cutting means in the cutting displacement thereof, the axes of rotation of said first and second cutting means extending essentially away from said ground opening, said housing being formed with at least one partition extending essentially transversely to the axis of rotation of said first cutting means between said cutting and mulching compartments and at least in part defining at least one of said compartments, said partition being formed with at least one of said cutting compartment discharge opening or said mulching compartment entrance opening in a peripheral region thereof, said partition being otherwise essentially free of openings therethrough which permit the passage of cuttings therethrough, the at least one of said cutting compartment discharge opening or mulching compartment entrance opening formed in said partition being spaced radially from the axis of rotation of said second cutting means.

2. A mulching lawn mower as claimed in claim 1, wherein said first and second cutting means are each blade members.

3. A mulching lawn mower as claimed in claim 2, wherein each of said blade members includes a substantially radially extending portion which is inclined at an angle to the plane of rotation thereof for effecting the drawing of leaves, cuttings and mulched cuttings.

4. A mulching lawn mower as claimed in claim 3, wherein each of said inclined portions of a blade member defines a blade, said blade members including four said blades.

5. A mulching lawn mower as claimed in claim 1, including means operatively coupling said first and second cutting means and said motor means for the cutting displacement of said first and second cutting means as a unit about a common axis.

6. A mulching lawn mower as claimed in claim 1, wherein said housing is formed with said cutting compartment and said mulching compartment in spaced relation and including chute means interconnecting said cutting compartment discharge opening and said mulching compartment exit opening shaped to direct said cut grass and the like along said predetermined path.

7. A mulching lawn mower as claimed in claim 1 and including a rigid storage chamber releasably secured to said housing and including an entrance opening in the bottom thereof in registration with said housing exit opening for receiving mulched cuttings therefrom and for storing same.

8. A mulching lawn mower as claimed in claim 7, wherein said storage chamber includes a hinged cover member hingedly secured to said storage chamber and means releasably retaining said hinged cover member in a closed position, whereby the mulched cuttings may be readily removed from said storage chamber.

9. A mulching lawn mower as claimed in claim 1, including shaft means defining the axes of rotation of said first and second cutting means, said motor means being secured to said housing at a position radially spaced from the axes of rotation of said shaft means, and further including means operatively coupling said motor means and said shaft means for the cutting displacement of said first and second cutting means.

10. A mulching lawn mower as claimed in claim 9, wherein said coupling means includes a first wheel means mounted for driving rotation by said motor means and a second wheel means mounted for rotation to said shaft means for rotation thereof and rotation transmission means coupling said first and second wheel means.

* * * * *